United States Patent [19]

Kircher et al.

[11] Patent Number: 4,658,939

[45] Date of Patent: Apr. 21, 1987

[54] PROCESS AND APPARATUS FOR THE CONTROL OF A BRAKE UNIT FOR AUTOMOTIVE VEHICLES

[75] Inventors: Dieter Kircher, Frankfurt am Main; Hubertus von Gruenberg, Kronberg; Klaus D. Blum, Kelkheim; Peter Becker, Frankfurt am Main, all of Fed. Rep. of Germany

[73] Assignee: Alfred Teves GmbH, Frankfurt, Fed. Rep. of Germany

[21] Appl. No.: 711,858

[22] Filed: Mar. 14, 1985

[30] Foreign Application Priority Data

Mar. 19, 1984 [DE] Fed. Rep. of Germany ....... 3410006

[51] Int. Cl.$^4$ .......................... B60T 8/02; B60T 13/66; B60T 13/74

[52] U.S. Cl. ...................... 188/156; 180/197; 188/72.8; 188/106 P; 303/3; 303/20; 303/101

[58] Field of Search ................... 188/156–164, 188/72.1, 72.7, 72.8, 106 R, 106 P, 105, 106 F, 2 D, 3; 303/3, 6 A, 6 R, 15, 13, 20, 91–92, 100, 52, 101, 93, 98, 102, DIG. 1, DIG. 2; 180/197, 271; 60/545

[56] References Cited

U.S. PATENT DOCUMENTS

| | | | |
|---|---|---|---|
| 1,300,094 | 4/1919 | Adler | 188/156 |
| 1,882,746 | 10/1932 | Bendix | 188/156 |
| 1,915,877 | 6/1933 | Apple | 188/156 |
| 1,990,448 | 2/1935 | Apple et al. | 188/156 |
| 2,039,509 | 5/1936 | Adams | 188/3 |
| 2,860,737 | 11/1958 | Hines | 188/156 |
| 3,169,595 | 2/1965 | Shepherd | 303/20 X |
| 3,353,634 | 11/1967 | Farrar | 188/106 |
| 4,270,806 | 6/1981 | Venkataperumal et al. | 303/3 |
| 4,357,055 | 11/1982 | Leiber et al. | 303/52 |
| 4,436,347 | 3/1984 | Stumpe | 303/15 X |

FOREIGN PATENT DOCUMENTS

| | | |
|---|---|---|
| 0851602 | 10/1952 | Fed. Rep. of Germany . |
| 2128169 | 12/1972 | Fed. Rep. of Germany . |
| 2208936 | 9/1973 | Fed. Rep. of Germany . |
| 2541416 | 3/1977 | Fed. Rep. of Germany . |
| 323072 | 12/1929 | United Kingdom ................ 188/156 |
| 359033 | 10/1931 | United Kingdom ................ 188/156 |
| 0705462 | 3/1954 | United Kingdom . |
| 2129079 | 5/1984 | United Kingdom . |

OTHER PUBLICATIONS

"Der elektronische Gleitschutz beim Triebzug ET420", Elektrische Bahnen, 1979, H.1, pp. 18–21.

Primary Examiner—Douglas C. Butler
Attorney, Agent, or Firm—James B. Raden; William J. Michals

[57] ABSTRACT

For the control of a brake unit for automotive vehicles, electric signals are generated dependent on the operation of the brake pedal. The signals are processed in an electronic circuit (8) and logically linked to sensor signals containing information on the brake power, the braking effect and/or on the rotational behavior of the individual wheels. Electrically actuatable wheel brakes (1, 2, 3, 4, 32, 33) equipped with an electric drive (M) are controlled by the generated signals. Through a second brake system, brake power is transmitted by the brake pedal (5, 5') either simultaneously or upon overcoming a threshold value to the wheels of one axle, preferably to the front wheels, i.e. front right, front left wheels (VR, VL), the brake power becoming, however, effective exclusively in the event of a fault or a failure of the electrical brake system or of the electric power supply.

6 Claims, 3 Drawing Figures

PROCESS AND APPARATUS FOR THE CONTROL OF A BRAKE UNIT FOR AUTOMOTIVE VEHICLES

BACKGROUND OF THE INVENTION

The present invention relates to a process for the control of a brake unit for automotive vehicles in which process an electrical brake system is used. Electric signals which are generated dependent on the operation of the brake pedal, are processed electronically and are logically linked to signals derived from the brake power, the braking effect and/or the rotational behavior of the wheels. The electrically actuatable wheel brakes are controlled by means of these signals.

Electrical brakes for automotive vehicles are known in which by means of the brake pedal an ohmic resistance is varied which determines the energy flow to an electromagnet that exerts a brake pressure on the pertaining wheel brake corresponding to the power brought to bearing on its armature (German patent specification No. 851,602). A hand lever may interfere in the lever mechanism which transmits the force from the magnet to the friction lining of the wheel brake and, consequently, a brake pressure independent of the field of strength of the magnet may be transmitted mechanically to the wheel brake.

Furthermore, an electrical brake system is known in which an electric motor acts through a spindle on a piston which is, on its part, connected hydraulically with the piston of a wheel brake. In this configuration, the control signal to actuate the motor and, therefore, to apply and release the wheel brake is determined by the bridge voltage of a Wheatstone bridge which is furnished with two variable resistances, one of which being adjusted proportionally to the operation of the brake pedal. The setting of the second variable resistance is dependent on the hydraulic brake pressure. In addition, a logic intervenes in the bridge circuit, which logic receives output signals from a sensor monitoring the rotational behavior of the wheels (German patent application No. 2,128,169). The brake fails in the event of a failure of the electric power supply or in the event of an electric component becoming defective.

In a further known electrical vehicle brake unit (German patent application No. 2,926,017), the operation of the brake pedal leads to the generation of a digital signal being redundantly transmitted through two sensors to a control logic which furnishes output signals for an electric motor dependent on different sensor signals. The electric motor generates brake pressure for a hydraulic wheel brake through a spindle and the piston of a pressure modulator. Thus unit also requires an emergency brake which renders it possible to brake the vehicle in case of a failure of the source of the electrical energy or of a fault in the electrical system.

The object of the present invention is to overcome the inconveniences of the known electrical brake systems and to create a process for the control of an electronically controllable and adjustable heavy-duty brake unit which allows to be realized in the shape of a comparatively simple brake unit requiring but little effort for its manufacture and which renders it possible to safely brake the vehicle even in the event of a failure or a fault of the electric power supply or of the electric components.

SUMMARY OF THE INVENTION

This object is attainable in a simple but technologically advanced manner by means of a process wherein brake power is generated by means of the brake pedal through a second brake system and is transmitted to the wheels of at least one vehicle axle, and wherein the brake power transmitted through the second brake system is rendered fully effective exclusively in the event of a fault or a failure of the electrical brake system.

According to one embodiment of the present invention, the second brake system is put into operation automatically as soon as the force exerted on the brake pedal or as soon as the brake pedal travel exceeds a predetermined limit value due to a fault of the electrical brake system.

On the other hand, it is also possible to actuate the second brake system simultaneously with the electrical brake system at each operation of the brakes, the second system becoming, however, effective either not at all or only to a minor extent, since the electrical brake system has a more elevated brake power boosting and a higher braking effect. In case of a failure of the electrical system, there will then be available at once the second system, of which condition the driver will be informed by the higher pedal operating effort required, by a longer pedal travel and/or by signalling.

In the second brake system, the brake power is transmitted to the wheel brakes of one axle in a particularly simple way mechanically, for example with the aid of a cable, or by means of a greatly simplified hydraulic device. Expediently, the second brake system acts on the front wheels which normally receive the higher brake power. The unbraked rear wheels reduce the risk of skidding in this situation.

According to another embodiment of the inventive process, the second brake system is locked as long as the electrical system and the electric power supply are intact, and is unlocked automatically in the event of a failure or fault of the electrical brake system. With the aid of a second system always actuated simultaneously with the electrical brake system, a brake pedal travel simulation for the drive also allows to be realized in a very simple manner.

For the realization of the process according to the invention, a brake unit with an electrical brake system is provided with a brake signal transmitter actuated by the brake pedal and is equipped with sensors and electronic circuits for the collection, analyzing and processing of signals which are derived from the brake pressure, the brake power, the braking effect and/or the rotational behavior of the wheels. The electrical brake system is equipped for logic linkage of these signals with the output signals of the brake signal transmitter and which is furnished with electrically actuatable wheel brakes. That is, with wheel brakes which are provided with an electric drive and whose particularity consists in that the brake unit is equipped with a second brake system by means of which a brake power determined by the force exerted on the brake pedal is transmittable to the wheels of at least one vehicle axle.

According to an advantageous embodiment of the brake unit as per the present invention, the second brake system comprises a lever device by which the pedal force is transmittable mechanically, for example through cables, to the wheel brakes of one axle. On the other hand, the second brake system may also be furnished with a master cylinder with a cylinder piston actuated by the brake pedal, which master cylinder is coupled hydraulically with the wheel brakes of one axle, preferably of the front axle. Furthermore, it is of advantage in many cases to envisage a pedal force pickup unit which is configured as a brake signal transmitter and travel simulator for the electrical brake system and as a brake pressure transmitter or a mechanical brake power translator for the second brake system.

According to a further embodiment of the invention, it is envisaged to transduce the pedal force into a corresponding digital signal by means of the brake signal transmitter. On the other hand, a voltage or current value analogous to the pedal force may also originate in the brake signal transmitter.

If according to the invention the second brake system is actuatable, in addition, through a lockable lever arrangement, then this system may also serve as a parking brake.

Moreover, an advantageous embodiment of the invention consists in that the electrically actuatable wheel brake is designed in the shape of a disc brake whose brake shoes are pressable to the brake disc with the aid of an electric motor which serves as an electric drive, and in that the electric motor is linked, through a spindle positioned in the direction of slide of the brake shoes and through a recirculating ball worm gearing, to an axially slidably supported piston which acts on the brake shoe.

Expediently, an automatically operating mechanical adjusting device is provided to maintain the predetermined clearance gap between the brake shoes and the brake disc.

According to the invention, the adjustment of the clearance gap caused by the wear of the brake linings may also be made with the aid of the electric drive, for which purpose a circuit is provided that limits electronically the restoring travel of the piston in accordance with the predetermined clearance gap between the brake disc and the linings when the brake is being released.

In a further expedient embodiment of the brake unit of the present invention the piston acting on the brake shoes is located and guided in a liquid-tight manner within the wheel brake in a brake cylinder. That is, in such a way that between the rear wall of the cylinder and a surface of the piston a power chamber is formed into which hydraulic pressure is controlledly conveyable through the second brake system for an operation of the wheel brakes independent of the actuation of the electric drive.

On the other hand, it is also possible to press the brake shoes to the brake disc in the wheel brakes independently of the actuation of the electric drive by means of an additional lever arrangement which is coupled to the second brake system.

The brake unit according to the present invention is used in an ideal manner both to control the distribution of the brake power to the front axle and the rear axle of the vehicle dependent on the operation of the brake pedal and on the rotational behavior of the wheels, in particular dependent on the slip at the front axle, and, in addition, be used for the control of the brake slip and for traction slip control, that is to say, as a means for the prevention of wheel locking, on the one hand, and for the prevention of the race of wheels as a result of an excessive driving torque, on the other hand.

BRIEF DESCRIPTION OF THE DRAWING

Further characteristics, advantages and possibilities of application of the present invention are revealed in the following description and by the accompanying drawing in which.

DETAILED DESCRIPTION

Figure 1:
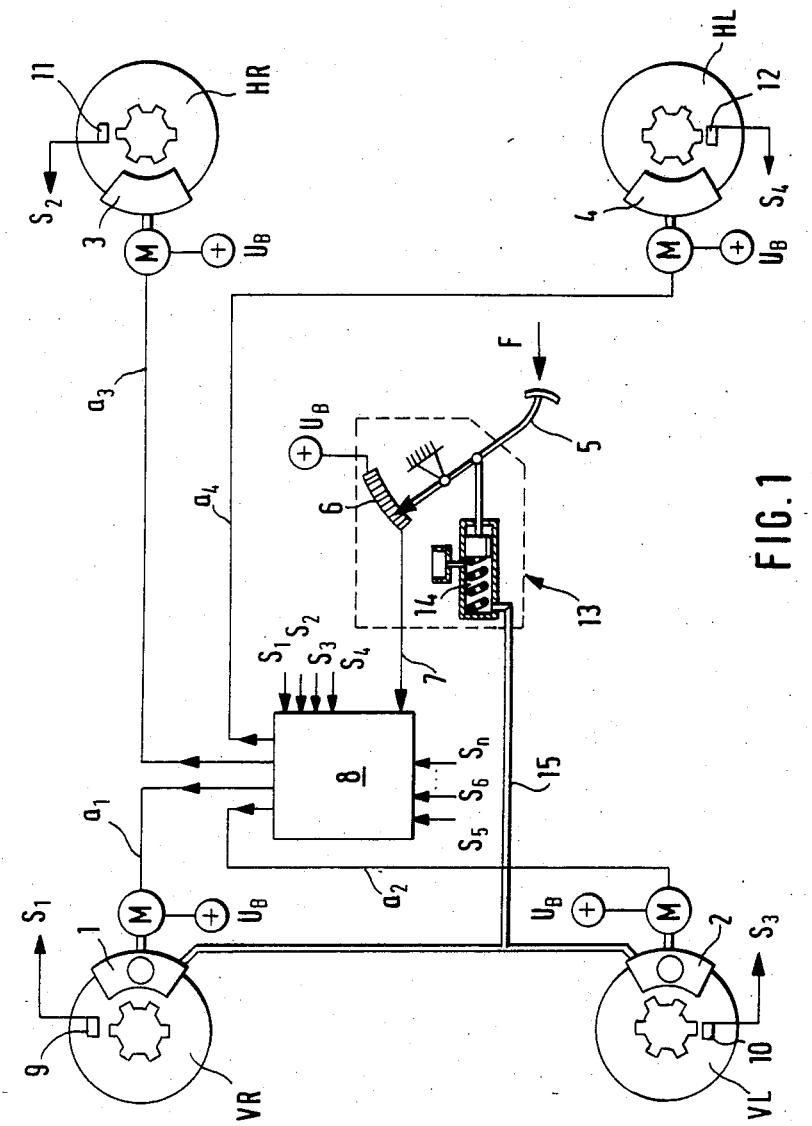
FIG. 1 is a simplified elementary diagram of one embodiment of the invention.

The brake unit of FIG. 1 is, designed for example, for a passenger vehicle. Each wheel, front right VR, front left VL, rear right HR, rear left HL, is furnished with a spot-type disc brake 1 to 4 which is equipped with an electric drive, namely an electric motor M, that is put into operation on actuation of the brakes and that presses the brake shoes with the requisite force from either side against a brake disc rotating jointly with the wheel.

In an electrical brake system of the kind shown in FIG. 1, the energy required to press the brake shoes to the brake disc is derived from the electrical supply system which is, as a rule, essentially comprised of an accumulator being recharged by means of the generator when the engine is running. The source of supply is symbolized with $+U_B$ in FIG. 1. In the embodiment described in this instance, each motor is directly connected to the battery $U_B$, for which reason the lines $a_1$ to $a_4$ have to be considered as control lines which merely transfer the instructions for the setting in motion, the stoppage and the reversing of the motor M.

In an alternative electrical brake system which is not illustrated, both the signals and the required electrical driving energy are transferred over the control lines, so that the individual connections to the source of supply $U_B$ which are outlined in FIG. 1 would become nil in that case.

The force exerted on the brake pedal 5, which generally is the foot brake, when the brake is operated is symbolized with F and an arrow. In this configuration, the pedal travel of the brake pedal 5 is transmitted through a sliding contact to an adjustable ohmic resistance 6 which feeds an electric signal corresponding to the pedal force F, or, just as well, to the pedal travel through a signalling line 7 into an electronic circuit 8. With the aid of the said electronic circuit 8 which may also be realized in the shape of one or several program-controlled microcomputers, sensor signals $S_1$ to $S_n$ are logically linked among one another and to the brake actuation signal transmitted through the signalling line 7. Control signals are generated in this way which are supplied through the lines $a_1$ to $a_4$ to the electric driving motors M of the individual wheel brakes 1 to 4.

The inputs for the sensor signals $S_1$ to $S_4$ are connected with wheel sensors 9 to 12 arranged at the individual wheels, by which sensors 9 to 12 voltages are picked up inductively in co-operation with the outlined studded discs, the frequencies and frequency changes of said voltages allowing to draw conclusions on the rotational speed of the wheels and on their rotational behavior.

Depending on the specific design of the brake unit, further sensors are connected through the sensor inputs $S_5$, $S_6$. $S_n$ which allow to cover, for example, the brake torques at the individual wheels, the translation deceleration of the vehicle and/or other variables to be measured which are determined by the braking effect. In many cases, however, the sensor signals $S_1$ to $S_4$ will be sufficient, since adopting a skillful logic linkage they allow to detect the slip at the individual wheels, the individual wheel deceleration and acceleration, a variable approximating the vehicle speed, etc. to serve as actuating and controlling variables for the brake system.

In the embodiment according to FIG. 1, the pedal force pick-up unit designated in its entirely with the reference numeral 13 and framed by a dashed line in the illustration comprises one single master cylinder 14 by means of which hydraulic pressure is built up on operation of the brake pedal 5, said hydraulic pressure being conveyed to the wheel brakes 1, 2 of the front right and front left wheels VR, VL through the hydraulic line 15. This hydraulically transmitted brake pressure which is generated in this configuration simultaneously with the signals to control the electrical brake system when the pedal 5 is operated does, however, not become effective at all or become effective only at a negligible extent as long as the electrical brake system and the electric power supply are sound, because auxiliary energy to boost the pedal force F is made available exclusively to the electrical brake system, namely in the shape of electrical energy to drive the motors M.

A comparatively low brake power boosting in the second brake system can also be provided if necessary.

In the event of a failure of the electric power supply, of a defect or of a transitory fault, the front wheel brakes, 1, 2 will, however, be supplied immediately with brake pressure through the brake pedal 5 and the master cylinder 14, so that at least an emergency stop remains possible anyway.

For reasons of safety, the electrical brake system is designed in such a manner that any defect and any failure of the electrical energy leads to the release of the electrically driven system of the wheel brakes.

Instead of the sliding contact 6, that means of the adjustable ohmic resistance, it is expedient to employ a transducer which immediately generates a digitally encoded signal corresponding to the pedal force F and transmits it to the circuit 8. In the embodiment according to FIG. 1, a simulation of the pedal travel and a force directed contrary to the direction of the pedal force F are, for example, caused by a spring in the master cylinder 14.

By means of the logical linkage with the sensor signals of the control signal which is proportional to the force F and is supplied over the line 7, the actual value of the brake power, of the braking effect, of the slip or of other, derived variables is electronically compared at each wheel with the rated value determined by the pedal force F exerted by the driver, and is adjusted to equal the rated value. In this manner, tolerances, wear, and differing conditions at the individual wheels are balanced automatically.

With the aid of the circuit 8, a brake slip control which prevents the wheels from locking therefore allows to be included with but little additional design efforts in the electric control system and especially in the electronic linkage. Obviously, it is also possible to extend the system for the purpose of limitation of the traction slip.

Figure 2:
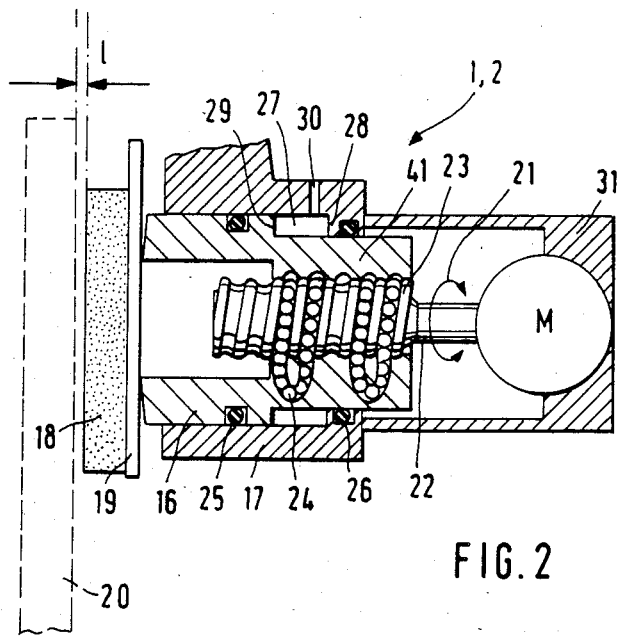
FIG. 2 is a cross-sectional partial view of a wheel brake of the brake unit according to FIG. 1; and, FIG. 3 is a further embodiment of the invention, in a type of illustration similar to that in FIG. 1.

FIG. 2 illustrates a possibility of realization of the front wheel brake 1 or 2 of a brake unit according to FIG. 1. Only the piston 16 in the cylinder housing 17 of a wheel brake structured according to the principal of a hydraulically actuated fist-type caliper disc brake is shown in FIG. 2 in an axial cross-section. With the aid of the piston 16 which is axially slidable within the housing 17 of the disc brake, the brake shoe 18, 19 being in abutment against the left front surface of the piston 16 as viewed in FIG. 1 and consisting of the lining 18 and the lining carrier 19 is pressed against the brake disc 20 shown in dashed lines, for which purpose the piston 16 with the brake shoe 18, 19 must first overcome the clearance gap 1.

In this case, an electric motor M, in particular a direct current motor, which can be driven in either sense of rotation as outlined by the double arrow 21 serves to electrically drive the piston 16. Through a shaft 22 driven by the electric motor M, the rotary motion is transmitted to a worm shaft or spindle 23 and by means of the latter through an internal thread in the rear wall 41 to the piston 16.

The device for the transformation of the rotary motion into a longitudinal motion shown in FIG. 2 is constituted by a recirculating ball worm gearing which is essentially comprised of the spindle 23, the balls 24 received within closed spirals, and the internal thread in the rear wall 41 of the piston 16. In this configuration, the balls 24 are arranged within two double spirals for improved and uniform power transmission.

This piston 16 is configurated as a stepped piston whose rear portion engaging with the spindle 23 passes through the rear wall 28 of the cylinder housing 17.

Sealing rings 25, 26 are arranged within the cylinder housing 17 as well as in the range of the passage through the rear wall 28 of the cylinder housing 17 in order that an annular chamber 27 is formed in the housing 17 between the housing rear wall 28 and the step 29 of the stepped piston 16, into which annular chamber 27 hydraulic pressure allows to be controlledly conveyed through a connecting port 30.

When the annular chamber 27 is connected hydraulically with the exit of the master cylinder 14—compare FIG. 1—via the inlet port 30, the piston 16 and together with it the brake shoe 18, 19 allows to be slided both by the electrical brake system through the electrical driving motor M and, independently of the electric drive, through the second brake system 14, 15, 27. It is of importance in this context that the recirculating ball worm gearing employed in the embodiment described has no nonreversibility so that—in contrast to simple worm gearings of high transmission ratio—a power transmission can take place both from the spindle 23 to the piston 16 and viceversa.

In this instance, the motor M is coupled to the cylinder housing 17, 28 through a rigid housing 31.

In disc brakes, the clearance gap 1 must, on principle, not exceed a certain value, for which purpose a lining self-adjustment is customarily provided to balance the wear of the lining. In the electrical brake system employed in accordance with the present invention, the clearance gap adjustment is carried out by electronic control at the moment the piston 16 is restored upon the release of the brake. This allows to be realized in different ways. For example, the lifting-off of the brake shoe from the brake disc 20 can be detected by a contact or by a pressure sensor and thereupon the restoration of the piston be immediately stopped.

The wheel brakes 3, 4 in the embodiment according to FIG. 1 do not require any hydraulic connection. For reasons of simplicity, brakes of identical type can, however, be used both at the front right, front left wheels VR, VL and at the rear right, rear left wheels HR, HL.

Figure 3:
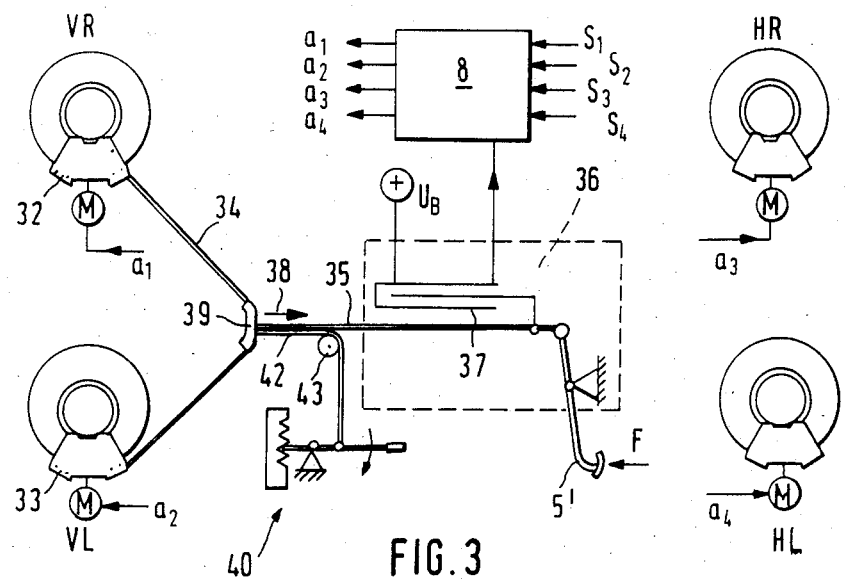

According to a further, particularly simple-design embodiment which is illustrated in FIG. 3, a mechanical brake power transmission with the aid of a cable assembly is used for the second brake system instead of the hydraulic system described in the foregoing with reference to FIGS. 1 and 2. In this version, wheel brakes 32, 33 are arranged at the front right, front left wheels VR, VL which allow to be operated both through an electric drive M and through a cable assembly 34, 35. The pedal force pick-up unit 36 comprises a lever arrangement in this embodiment by means of which on operation of the brake pedal 5', a travel simulator and brake signal transmitter 37 is actuated, on one hand, which latter transmits signals to the electronic circuit 8 which are proportional to the pedal effort, and in which tractive force is exerted, on the other hand, through the cable 35 on a sleeve 39 in the direction of the arrow 38, said sleeve 39 uniformly conveying that tractive force via the cable 34 to the mechanical power-supply connection of the wheel brakes 32, 33.

Also in this case, the braking effect of the electrical brake system, of which only the electronic circuit 8, the signal outputs $a_1$ to $a_4$ and the electric driving motors M are illustrated in the diagram, is higher than the braking effect through the cable assembly 34, 35, so that the mechanical brake power transmission to the front wheels becomes effective only in the event of a fault or a failure of the electrical brake system.

The mechanical brake through the cable assembly 34, 35 and the front wheel brakes 32, 33 according to FIG. 3 can also be employed as a parking brake. It will be sufficient for the purpose to provide a locking lever making catch at the cable 35 or being fastened to the sleeve 39 via a separate cable 42 and an angle sheave 43 to lock the mechanically operated front wheel brakes 32, 33 in the applied condition. The whole lever arrangement with a symbolically outlined notched arrest is designated with reference numeral 40 in FIG. 3.

In the embodiments described on the basis of FIGS. 1 to 3, the second brake system is actuated simultaneously with the electrical brake system. As an alternative, it will, however, be possible also to first lock the second brake system, for example with the aid of magnetically controlled latch, and to release it only in the event of a failure of the current supply or of a fault of the electrical brake system.

Furthermore, it may be expedient to initiate the actuation of the second brake system only after the brake pedal 5, 5' has travelled a certain distance or after the force F has exceeded a threshold value. Also a combination of the variety of conditions for the putting into operation of the second brake system is reasonable.

The object of safeguarding a safe braking of the vehicle even in the event of a failure of the electric power supply and of a fault or of a defect of a component is, therefore, attained in a very simple manner by the inventive process and the relevant apparatus, using a substantially electrical brake unit.

The advantages offered by electrical brake units and by the electronic control are therewith combined with the advantages of non-electrical systems.

If the use of hydraulic fluid in the wheel brake is foregone or if the requirements the hydraulic fluid contained in the wheel brake has to meet are alleviated, the admissible operating temperature in the wheel brake will allow to be increased considerably. The integration of the inventive brake unit with brake slip and traction slip control systems is possible with minimum additional effort.

What is clamed is:

1. A method for controlling the distribution of braking power to the wheels of an automotive vehicle upon the actuation of a vehicle brake pedal, said method comprising the steps of:
   deriving an electrical input signal corresponding to the applied brake pedal force;
   sensing at least one vehicle wheel to determine its rotational behavior;
   deriving an electrical input signal indicative of the sensed wheel rotational behavior;
   processing said input signals to provide an electrical output signal indicative of a predetermined wheel braking effect;
   transmitting said electrical output signal to the vehicle wheels;
   electromagnetically applying braking power at each wheel in response to said electrical output signal;
   generating backup braking power directly in response to said applied brake power force;
   transmitting mechanically said backup braking power to at least one vehicle wheel; and,
   selectively applying the transmitted backup braking power to at least one vehicle wheel.

2. The method according to claim 1 wherein the second transmitting step includes the step of hydraulically transmitting said backup braking power.

3. The method according to claim 1 wherein the second deriving step includes the step of deriving an electrical input signal indicative of wheel slip at at least one wheel.

4. Apparatus for controlling the distribution of braking power to the wheels of an automotive vehicle upon the actuation of a vehicle brake pedal, said apparatus comprising in combination:
   means for deriving an electrical input signal corresponding to the applied brake pedal force;
   means for sensing at least one vehicle wheel to determine its rotational behavior;
   means for deriving an electrical input signal indicative of the sensed wheel rotational behavior;
   means for processing said input signals to provide an electrical output signal indicative of a predetermined wheel braking effect;
   means for transmitting said electrical output signal to the vehicle wheels;
   means for electromagnetically applying braking power at each wheel in response to said electrical output signal;
   means for generating backup braking power directly in response to said applied brake power force;
   means for transmitting mechanically said backup braking power to at least one vehicle wheel; and,
   means for selectively applying the transmitted backup braking power to at least one vehicle wheel.

5. The apparatus according to claim 4 wherein the second means for transmitting includes means for hydraulically transmitting said backup braking power.

6. The apparatus according to claim 4 wherein the second means for deriving includes means for deriving an electrical input signal indicative of wheel slip at at least one wheel.

* * * * *